Figure 1:
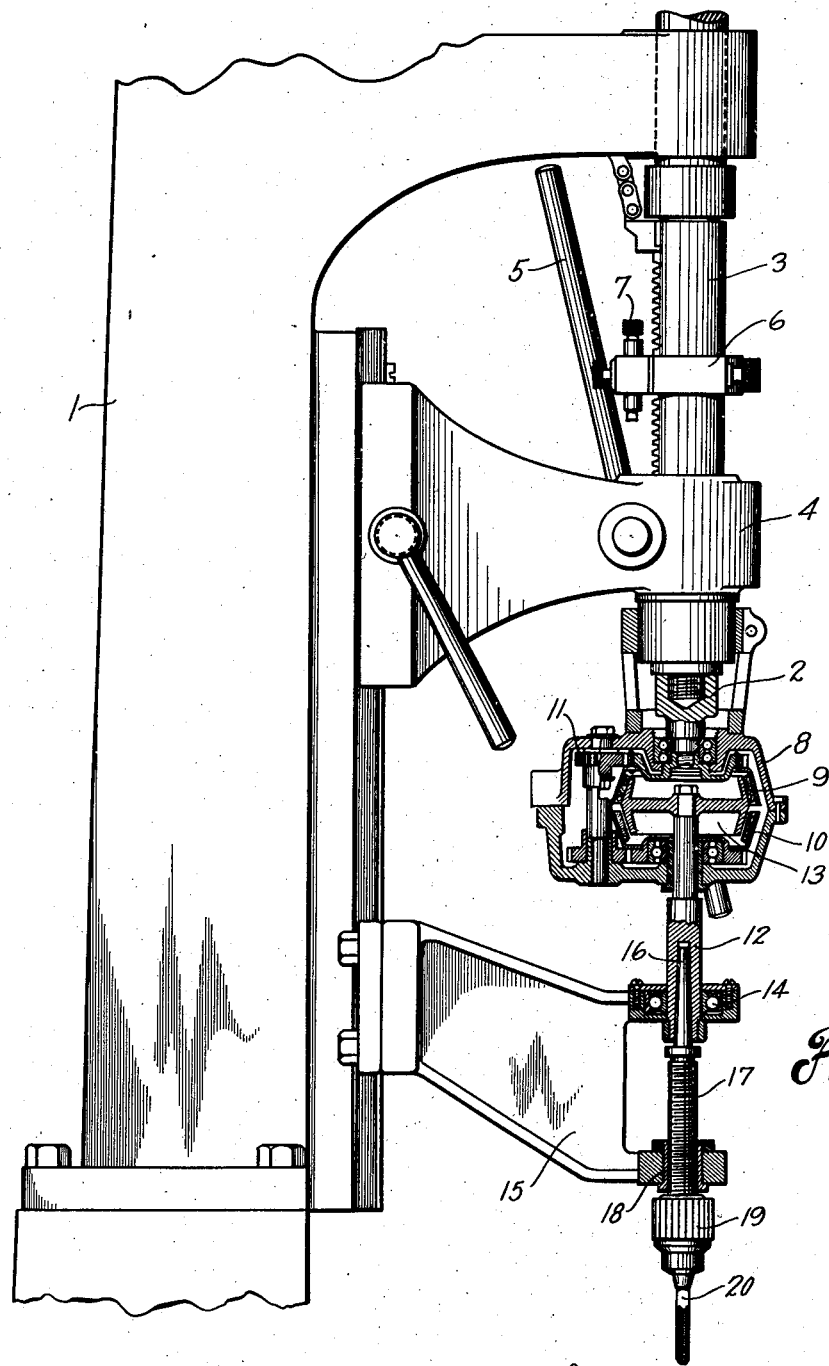

Patented July 31, 1945

2,380,387

UNITED STATES PATENT OFFICE 2,380,387

TAPPING MACHINE

Clarence M. Allen, Gates Mills, Ohio, assignor to Chas. G. Allen Company, Barre, Mass., a corporation of Massachusetts Application April 3, 1943, Serial No. 481,689

9 Claims. (Cl. 10—136)

This invention pertains to tapping machines, and more particularly to an apparatus wherein a tool is alternately advanced and retracted through predetermined range of travel under influence of a non-reversing drive spindle and automatically arrested at the opposite limits of its travel movement.

For illustrative purpose, but with no intent to unduly limit the operation or restrict the application of the invention, it is herein shown and described as applied to operation of a tapping tool, for which it is especially well adapted, though it is to be understood that it is not limited thereto, but may be utilized for other machining operations.

In the present disclosure the ratio of advancement and retraction of the tapping tool is governed by an associate lead screw whereby the tap is relieved of lineal pressure and strain, thus minimizing stress thereon and facilitating more accurate and uniform threading operation thereof.

The object of the invention is to improve the construction as well as the means and mode of operation of thread tapping machines, whereby they may not only be economically constructed and operated, but will be more efficient in use, uniform in operation, semi-automatic in action, having relatively few operating parts, and be unlikely to get out of order.

A further object of the invention is to embody reversible thread cutting mechanism in a non-reversible spindle machine of the drill press type.

A further object of the invention is to provide in association with a non-reversible drive spindle a reversible lead screw and means for rotating the lead screw alternately in opposite directions by the unidirectional operation of the drive spindle.

A further object of the invention is to provide an apparatus of the character described having the advantageous structural features and the meritorious inherent characteristics and mode of operation herein set forth.

While the instant apparatus has been especially designed for thread tapping purposes, it is obviously applicable to other purposes wherein controlled reversible rotation is required.

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawing.

In the drawing, there is shown a side elevation partly in section of an apparatus in which the present invention is embodied.

Like parts are indicated by similar characters of reference throughout the drawing.

Referring to the drawing, 1 indicates an upright frame in which is mounted a unidirectional rotary spindle 2. The spindle extends through a conventional spindle quill or rack sleeve 3 mounted in a frame arm 4 and reciprocated to raise and lower the spindle 2 by a hand lever 5 engaged with the quill or rack sleeve by the usual pinion. The descent of the quill and spindle under control of the hand lever 5 is limited by an adjustable stop collar 6 clamped upon the quill or sleeve 3, which carries a further adjustable stud 7 for minute determination of the stop position. A similar collar and stud may be employed to gage the return movement. However, the retractive movement is preferably limited by engagement of the top of a clutch housing hereafter described with the under side of the mount arm 4.

The mounting arm 4 is vertically adjustable upon the frame 1, whereby the range of adjustment of the quill and spindle may be varied. The spindle 2 is rotated in one direction only by any suitable power drive connections. As thus far described, the structure is that of a conventional drilling machine, which, as hereafter described, is adapted for thread tapping and other analogous purposes.

Secured to the lower end of the reciprocatory spindle quill or rack sleeve 3 is a dual reverse clutch housing 8 having therein a pair of reversely disposed axially aligned tapered friction cups 9 and 10. These tapered frictional members 9 and 10 are interconnected through a back gear system 11 to simultaneously rotate the friction members in opposite directions under driving influence of the unidirectional spindle 2. The spindle 2 is directly connected to the upper tapered frictional clutch element 9. The latter is connected through the gear drive mechanism 11 to the lower tapered frictional clutch element 10. The gear ratio is preferably, although not necessarily, such that the lower or reverse clutch element is rotated at a greater speed than the driving clutch element to retract the tool more rapidly than it enters the work.

Loosely journaled in the bottom of the clutch housing 8 is a driven spindle 12 carrying intermediate the reverse tapered frictional clutch elements 9 and 10 a complementary reversely tapered friction head 13. By limited axial adjustment of the driven spindle 12 the reversely tapered friction head 13 is engageable with either the frictional clutch member 9 or 10 independently of the other, to thereby cause the driven spindle to rotate in either direction. The driven spindle 12 is mounted for both rotary and axial movement relative to an anti-friction bearing 14 in a frame arm 15. The driven spindle 12 is taper bored to receive in driving engagement the tapered shank 16 of a rotary lead screw 17 threaded in a feed nut 18 also supported on the frame arm 15. The lead screw 17 is interchangeable with others of different size or different pitch. Mounted on the lower end of the lead screw 17 is a chuck 19 in which is carried a conventional tapping tool 20. The pitch of the lead screw 17 and that of the tapping tool 20 are identical.

The construction is such that on the descent of the spindle quill or sleeve 3 and with it the drive spindle 2 under influence of the hand lever, the clutch head 13 carried by the driven spindle 12 engages with the upper frictional element 9 and is direct driven in unison with the drive spindle 2. The rotation of the driven spindle drives the lead screw 17 through the nut 18 and feeds the tapping tool 20 into the work. The latter performs only the thread cutting action. When the end of the predetermined range of operative movement is reached and the stop stud 7 engages the frame arm 4 to limit the advancement of the tapping tool, the clutch head is still in frictional driving engagement with the driving frictional element 9 which will momentarily continue the rotation of the lead screw and tapping tool until by the traction of the lead screw the clutch head is automatically disengaged and the rotation of the lead screw and tapping tool is arrested, and the tapered frictional clutch members 9 and 10 continue to rotate idly. Upon reversal of the hand lever 5 tending to retract the spindle quill 3 and drive spindle, the initial elevation thereof causes the lower tapered frictional element 10 to engage with the clutch head 13. The lower frictional clutch element being driven in reverse direction drives the lead screw and tapping tool reversely to withdraw the latter from the work without subjecting the tool to undue strain. At the upper limit of the range of travel of the parts a similar operation occurs. When the retractive movement is arrested by the engagement of the head of the clutch housing 8 with the under side of the arm 4, the clutch head 13 being yet in driving engagement with the lower frictional clutch element 10 will momentarily continue to rotate and to drive the lead screw 17 retractively within its feed nut 18. As the lead screw is retracted, engagement of the clutch head 13 with the reversely rotating clutch element 10 is relaxed until the clutch elements 9 and 10 again rotate idly and the head 13 and driven spindle 12 with the attached lead screw and tapping tool come to rest preparatory to repetition of the cycle. Although the apparatus has been described in its relation to tapping holes in a work body, it may be applied to other operations utilizing other tools. For example, a die may be attached to the lead screw and may be advanced and retracted measured distances and automatically arrested at the limits of the prescribed range of movement. For certain operations a boring tool, a grinder, or a milling cutter might be substituted for the tapping tool 20, within the scope of the invention.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. A tapping machine, including a reciprocatory unidirectional rotary drive shaft, a reversible rotary tapping tool, motion transmitting means for alternately actuating the tapping tool axially and rotatively in reverse directions by unidirectional rotation of the drive shaft, a stop limiting the reciprocatory motion of the drive shaft independently of the axial adjustment of the tapping tool, and a driving coupling connecting the rotary drive shaft and tapping tool automatically disengaged by axial movement of the tapping tool relative to the drive shaft incident to continued rotation thereof under influence of the drive shaft subsequent to arrest of the reciprocatory motion of the latter.

2. In an apparatus of the character described, a rotary axially adjustable drive shaft, a rotary axially adjustable tool carrier, a motion transmitting coupling therebetween by which unison rotary and axial motion is effected, a stop limiting the axial movement of the drive shaft independently of the axial movement of the tool carrier while continued rotary motion is being transmitted from the drive shaft to the tool carrier, the construction and arrangement being such that continued rotation of the tool carrier under influence of the drive shaft subsequent to arrest of axial movement of the latter effects independent axial adjustment of the tool carrier out of driving connection with the drive shaft.

3. In an apparatus of the character described, an axially adjustable unidirectionally revoluble drive shaft, an axially adjustable reversely revoluble lead screw, a driving connection therebetween by which unison rotary and axial adjustment is transmitted from the drive shaft to the lead screw, a stop for limiting the axial adjustment of the drive shaft independently of that of the lead screw while transmission of rotary motion thereto is continued, the construction and arrangement being such that the continued rotation of the lead screw in either direction under influence of the unidirectional rotation of the drive shaft subsequent to arrest of the axial adjustment of the latter effects axial adjustment of the lead screw out of driving connection with the drive shaft and thereby arrest the lead screw, and an operated device controlled by the lead screw.

4. In an apparatus of the character described, an axially adjustable revoluble drive shaft, an axially adjustable revoluble lead screw, an engageable and disengageable driving connection therebetween, by which rotary motion is transmitted from the drive shaft to the lead screw to effect axial adjustment of the latter, a stop for arresting the axial adjustment of the drive shaft while continuing to transmit rotary motion to the lead screw by which axial adjustment thereof is effected independently of that of the drive shaft, the construction and arrangement being such that the resulting independent axial adjustment of the lead screw automatically disconnects the latter and the drive shaft, and an operated device governed by the lead screw.

5. A machine tool wherein a unidirectional rotary drive spindle capable of limited axial movement drives a tapping tool alternately in opposite directions by means of an interposed disengageable drive coupling characterized by a lead screw having a pitch equal to that of the tapping tool connected therewith and driven by the spindle, a stationary threaded bearing in which the lead screw is rotatable for controlling the advancement and retraction of the tapping tool relative to the work and resisting axial reciprocation of the tapping tool under influence of axial movement of the drive spindle in either direction, whereby the tool is relieved of axial pressure in each direction, the construction and arrangement being such that the axial tractive influence of the lead screw in said stationary threaded bearing relieves the tool and freshly cut threads of undue pressure through the entire operating period and confines the resistance thereon to its rotary motion only.

6. A machine tool wherein a unidirectional rotary drive spindle capable of limited axial movement drives a tapping tool alternately in opposite directions by means of an interposed disengageable drive coupling characterized by a lead screw having a pitch equal to that of the tapping tool connected therewith and driven by the spindle, a stationary threaded bearing in which the lead screw is rotatable for controlling the advancement and retraction of the tapping tool relative to the work, and resisting thrust pressure thereon, incident to reciprocation of the drive spindle, a pair of frictional drive heads interconnected with each other for unison rotation in opposite directions and operatively connected with the drive spindle for actuation by unidirectional rotation thereof, a frictional head on the lead screw engageable alternately with the respective frictional drive heads upon corresponding relative axial movement of the spindle and lead screw one relative to the other, the construction and arrangement being such that during both the feeding and retractive movement of the tool, the tool and freshly cut threads are relieved of undue axial pressure incident to feeding movement and retraction of the tool.

7. A machine tool wherein a unidirectional rotary drive spindle capable of limited axial movement drives a tapping tool alternately in opposite directions by means of an interposed disengageable drive coupling characterized by a lead screw having a pitch equal to that of the tapping tool connected therewith and driven by the spindle, a stationary threaded bearing in which the lead screw is rotatable for controlling the advancement and retraction of the tapping tool relative to the work, and resisting axial pressure upon the tool incident to axial movement of the drive spindle, the continued rotation of the lead screw by the spindle after the spindle has reached the limit of its axial movement, and the axial adjustment of the lead screw incident to such continued rotation of the lead screw in said stationary bearing being effective to disengage the drive coupling to arrest the rotation of the tool.

8. A machine tool of the character described including a reciprocatory unidirectional rotary drive spindle, actuating means for rotating the spindle, feeding means for advancing and retracting the spindle axially, stops limiting the axial movement of the shaft in either direction, a pair of reversely rotatable frictional drive heads interconnected with the driving spindle for unison rotation in opposite directions, a reversable rotary lead screw, a stationary threaded bearing in which the lead screw is revolubly engaged for alternate axial movement in opposite directions incident to its rotation thereof in alternating directions, and effective to resist axial thrust pressure in either direction independently of the tool throughout the operative period, a friction head carried by the lead screw and engageable alternately with the reversely rotating frictional drive heads connected to the driving spindle, the construction and arrangement being such that during the period of operation while the drive spindle is being reciprocated the axial thrust pressure is resisted by the lead screw and threaded bearing, and the tool and work are relieved thereof, and upon arrest of the axial movement of the drive spindle one of the frictional driving heads actuated thereby will continue to rotate the lead screw incident to engagement of the frictional driving head with the frictional driven head carried by the lead screw, the rotation of which within the stationary threaded bearing will effect longitudinal movement of the lead screw to disconnect the driven head carried thereby out of driving engagement with the driving spindle to thereby arrest the rotation of the lead screw, and a tool actuated by movement of the lead screw.

9. A tapping machine, including a reciprocatory unidirectional rotary drive spindle, drive means therefor, feeding means for effecting longitudinal movement of the spindle, a reversable rotary adjustable lead screw, a relatively fixed threaded bearing in which the lead screw is revoluble in alternate directions to effect alternate axial movement of the screw, and resisting axial thrust pressure incident to reciprocation of the drive spindle, a pair of reversely rotating frictional driving heads interconnected with the driving spindle for unison rotation in opposite directions, a frictionally driven head on the lead screw interposed between the frictional drive heads and alternately engageable therewith upon relative axial movement of the drive spindle and lead screw, a stop for limiting the axial movement of the driving spindle while driving contact is maintained between one of said frictional driving heads rotated in unison with the spindle and the interposed frictional driven head upon the lead screw, to effect continued rotation of the lead screw until the axial movement thereof effects disengagement of the driving and driven heads, and a tool connected to and movable with the lead screw.

CLARENCE M. ALLEN.